US010967877B2

(12) United States Patent
Asakura et al.

(10) Patent No.: US 10,967,877 B2
(45) Date of Patent: Apr. 6, 2021

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Masahiko Asakura, Wako (JP); Kunimichi Hatano, Wako (JP); Naoto Sen, Wako (JP); Masaaki Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 170 days.

(21) Appl. No.: 16/090,849

(22) PCT Filed: Apr. 15, 2016

(86) PCT No.: PCT/JP2016/062121
§ 371 (c)(1),
(2) Date: Oct. 3, 2018

(87) PCT Pub. No.: WO2017/179193
PCT Pub. Date: Oct. 19, 2017

(65) Prior Publication Data
US 2019/0106118 A1 Apr. 11, 2019

(51) Int. Cl.
*B60W 50/08* (2020.01)
*G08G 1/00* (2006.01)
(Continued)

(52) U.S. Cl.
CPC ............ *B60W 50/08* (2013.01); *B60W 10/04* (2013.01); *B60W 10/20* (2013.01); *G05D 1/0088* (2013.01);
(Continued)

(58) Field of Classification Search
CPC ...... B60W 50/08; B60W 10/04; B60W 10/20; B60W 2554/80; B60W 2710/20;
(Continued)

(56) References Cited

U.S. PATENT DOCUMENTS

2003/0204300 A1 10/2003 Adachi
2010/0256852 A1* 10/2010 Mudalige ............... G08G 1/22
701/24
2018/0309869 A1* 10/2018 Moir ..................... H04W 24/08

FOREIGN PATENT DOCUMENTS

CN 101859494 10/2010
CN 103781685 5/2014
(Continued)

OTHER PUBLICATIONS

National Highway Traffic Safety Administration (NHTSA) "Human Factors Evaluation of Level 2 and Level 3 Automated Driving Concepts: Past Research, State of Automation Technology, and Emerging System Concepts". Jul. 2014. (see attached PDF version) (Year: 2014).*
(Continued)

*Primary Examiner* — Michael V Kerrigan
(74) *Attorney, Agent, or Firm* — Amin, Turocy & Watson, LLP

(57) ABSTRACT

A vehicle control system includes a recognition unit that is configured to recognize nearby vehicles traveling around a subject vehicle, an automated driving control unit that is configured to implement a plurality of automated driving modes in which at least one of speed control and steering control of the subject vehicle is automatically implemented, the plurality of automated driving modes having different degrees of surroundings monitoring obligation of the subject vehicle imposed on an occupant of the subject vehicle, and a management unit that is configured to manage the surroundings monitoring obligation of the subject vehicle, the
(Continued)

management unit being configured to reduce the surroundings monitoring obligation of the subject vehicle when vehicle platooning in which the subject vehicle travels while following a preceding vehicle traveling in front of the subject vehicle among the nearby vehicles recognized by the recognition unit is implemented by the automated driving control unit.

5 Claims, 11 Drawing Sheets

(51) Int. Cl.
*B60W 10/04* (2006.01)
*B60W 10/20* (2006.01)
*G05D 1/00* (2006.01)
*G05D 1/02* (2020.01)
*G08G 1/01* (2006.01)
*G08G 1/04* (2006.01)
*G08G 1/0967* (2006.01)
*G08G 1/0968* (2006.01)
*G08G 1/0969* (2006.01)

(52) U.S. Cl.
CPC .............. *G05D 1/0291* (2013.01); *G08G 1/00* (2013.01); *G08G 1/01* (2013.01); *G08G 1/04* (2013.01); *B60W 2554/80* (2020.02); *B60W 2710/20* (2013.01); *B60W 2720/106* (2013.01); *G05D 2201/0213* (2013.01); *G08G 1/0967* (2013.01); *G08G 1/0968* (2013.01); *G08G 1/0969* (2013.01); *G08G 1/22* (2013.01)

(58) Field of Classification Search
CPC ..... B60W 2720/106; G08G 1/00; G08G 1/01; G08G 1/04; G08G 1/0967; G08G 1/0968; G08G 1/0969; G08G 1/22; G05D 1/0088; G05D 1/0291; G05D 2201/0213
See application file for complete search history.

(56) References Cited

FOREIGN PATENT DOCUMENTS

| | | |
|---|---|---|
| CN | 104925064 | 9/2015 |
| JP | 2003-317199 | 11/2003 |
| JP | 2004-009829 | 1/2004 |
| JP | 2009-113602 | 5/2009 |
| JP | 2014-157489 | 8/2014 |
| JP | 2015-089801 | 5/2015 |
| JP | 2015-217798 | 12/2015 |
| JP | 2016-037192 | 3/2016 |
| WO | 2016/052507 | 4/2016 |

OTHER PUBLICATIONS

Japanese Office Action for Japanese Patent Application No. 2018-511855 dated Dec. 10, 2019.
International Search Report and Written Opinion for International Application No. PCT/JP2016/062121 dated Jul. 19, 2016, 9 pgs.
Chinese Office Action for Chinese Patent Application No. 201680084436.0 dated Aug. 4, 2020.

* cited by examiner

| DRIVING MODE<br>NON-DRIVING OPERATION SYSTEM | MANUAL DRIVING MODE | AUTOMATED DRIVING MODE | | | |
|---|---|---|---|---|---|
| | | MODE A | MODE B | MODE C | ... |
| NAVIGATION OPERATION | NOT POSSIBLE | POSSIBLE | POSSIBLE | NOT POSSIBLE | ... |
| CONTENT REPRODUCTION OPERATION | NOT POSSIBLE | POSSIBLE | NOT POSSIBLE | NOT POSSIBLE | ... |
| INSTRUMENT PANEL OPERATION | NOT POSSIBLE | POSSIBLE | POSSIBLE | POSSIBLE | ... |
| ... | ... | ... | ... | ... | ... |

|  | OTHER TRAVEL STATE | VEHICLE PLATOONING |
|---|---|---|
| SURROUNDINGS MONITORING | REQUIRED | NOT REQUIRED |
| NON-DRIVING OPERATION SYSTEM | AVAILABLE (NOT AVAILABLE IN SOME CASES) | AVAILABLE |
| TERMINAL DEVICE | NOT AVAILABLE | AVAILABLE |
| EACH MODE SPEED LIMIT | NOT CHANGEABLE | CHANGEABLE |

US 10,967,877 B2

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

In recent years, research on a technology for automatically controlling at least one of acceleration/deceleration and steering of a subject vehicle (hereinafter referred to as automated driving) has been performed. In connection therewith, a technology for executing automated driving control in any one of a predetermined standard control mode and a specific control mode different from the standard control mode has been disclosed (see, for example, Patent Document 1).

CITATION LIST

Patent Literature

[Patent Document 1] Japanese Unexamined Patent Application, First Publication No. 2015-89801

SUMMARY OF INVENTION

Technical Problem

A case in which an occupant of a vehicle may need to monitor the surroundings during automated driving is assumed. In the related art, since attention to the surroundings may be necessary during automated driving, a burden on an occupant of a vehicle may be increased.

The present invention has been made in view of such circumstances, and an object of the present invention is to reduce a burden on a vehicle occupant during automated driving.

Solution to Problem

An invention according to claim 1 is a vehicle control system including: a recognition unit that is configured to recognize nearby vehicles traveling around a subject vehicle; an automated driving control unit that is configured to implement a plurality of automated driving modes in which at least one of speed control and steering control of the subject vehicle is automatically implemented, the plurality of automated driving modes having different degrees of surroundings monitoring obligation of the subject vehicle imposed on an occupant of the subject vehicle; and a management unit that is configured to manage the surroundings monitoring obligation of the subject vehicle, the management unit being configured to reduce the surroundings monitoring obligation of the subject vehicle when vehicle platooning in which the subject vehicle travels while following a preceding vehicle traveling in front of the subject vehicle among the nearby vehicles recognized by the recognition unit is implemented by the automated driving control unit.

According to a vehicle control system according to claim 2, in the vehicle control system according to claim 1, the management unit is configured to set the surroundings monitoring obligation of the subject vehicle when vehicle platooning is implemented by the automated driving control unit to be lower than the surroundings monitoring obligation of the subject vehicle when the automated driving is implemented in travel conditions other than vehicle platooning by the automated driving control unit.

According to a vehicle control system according to claim 3, in the vehicle control system according to claim 1 or 2, the management unit is configured to suppress some or all of functions of a terminal device that is brought into a vehicle cabin of the subject vehicle and is able to be operated by the occupant of the subject vehicle when the automated driving mode in which the surroundings monitoring obligation of the subject vehicle is imposed on the occupant of the subject vehicle is implemented by the automated driving control unit.

According to a vehicle control system according to claim 4, in the vehicle control system according to claim 1, a speed limit is set to a speed that is able to be output at the time of speed control for each of the plurality of automated driving modes that is implemented by the automated driving control unit, and the management unit is configured to relax an upper vehicle speed limit with respect to the surroundings monitoring obligation of the subject vehicle when the vehicle platooning is implemented by the automated driving control unit, the upper vehicle speed limit being able to be limited.

An invention according to claim 5 is a vehicle control system including: a recognition unit that is configured to recognize a nearby vehicle traveling around a subject vehicle; and an automated driving control unit that is configured to implement an automated driving mode in which at least one of speed control and steering control of the subject vehicle is automatically implemented, the automated driving control being configured to implement any one of a plurality of automated driving modes having different degrees of automated driving, wherein the automated driving control unit is configured to change the automated driving mode to an automated driving mode in which a degree of automated driving is higher when vehicle platooning in which the subject vehicle follows a preceding vehicle traveling in front of the subject vehicle among the nearby vehicles recognized by the recognition unit is implemented.

An invention according to claim 6 is a vehicle control method including: recognizing, by an in-vehicle computer, nearby vehicles traveling around a subject vehicle; executing, by the in-vehicle computer, a plurality of automated driving modes in which at least one of speed control and steering control of the subject vehicle is automatically implemented, the plurality of automated driving modes having different degrees of surroundings monitoring obligation of the subject vehicle imposed on an occupant of the subject vehicle; and managing, by the in-vehicle computer, the surroundings monitoring obligation of the subject vehicle, and reducing the surroundings monitoring obligation of the subject vehicle when vehicle platooning in which the subject vehicle travels while following a preceding vehicle traveling in front of the subject vehicle among the recognized nearby vehicles is implemented.

An invention according to claim 7 is a vehicle control program causing an in-vehicle computer to: recognize nearby vehicles traveling around a subject vehicle; implement a plurality of automated driving modes in which at least one of speed control and steering control of the subject vehicle is automatically implemented, the plurality of automated driving modes having different degrees of surroundings monitoring obligation of the subject vehicle imposed on an occupant of the subject vehicle; and manage the surroundings monitoring obligation of the subject vehicle and reduce the surroundings monitoring obligation of the subject vehicle when vehicle platooning in which the subject vehicle travels while following a preceding vehicle traveling in front of the subject vehicle among the recognized nearby vehicles is implemented.

Advantageous Effects of Invention

According to the invention described in each claim, it is possible to reduce a burden on the vehicle occupant during the automated driving.

DESCRIPTION OF EMBODIMENTS

Hereinafter, embodiments of a vehicle control system, a vehicle control method, and a vehicle control program according to the present invention will be described with reference to the drawings.

Figure 1:
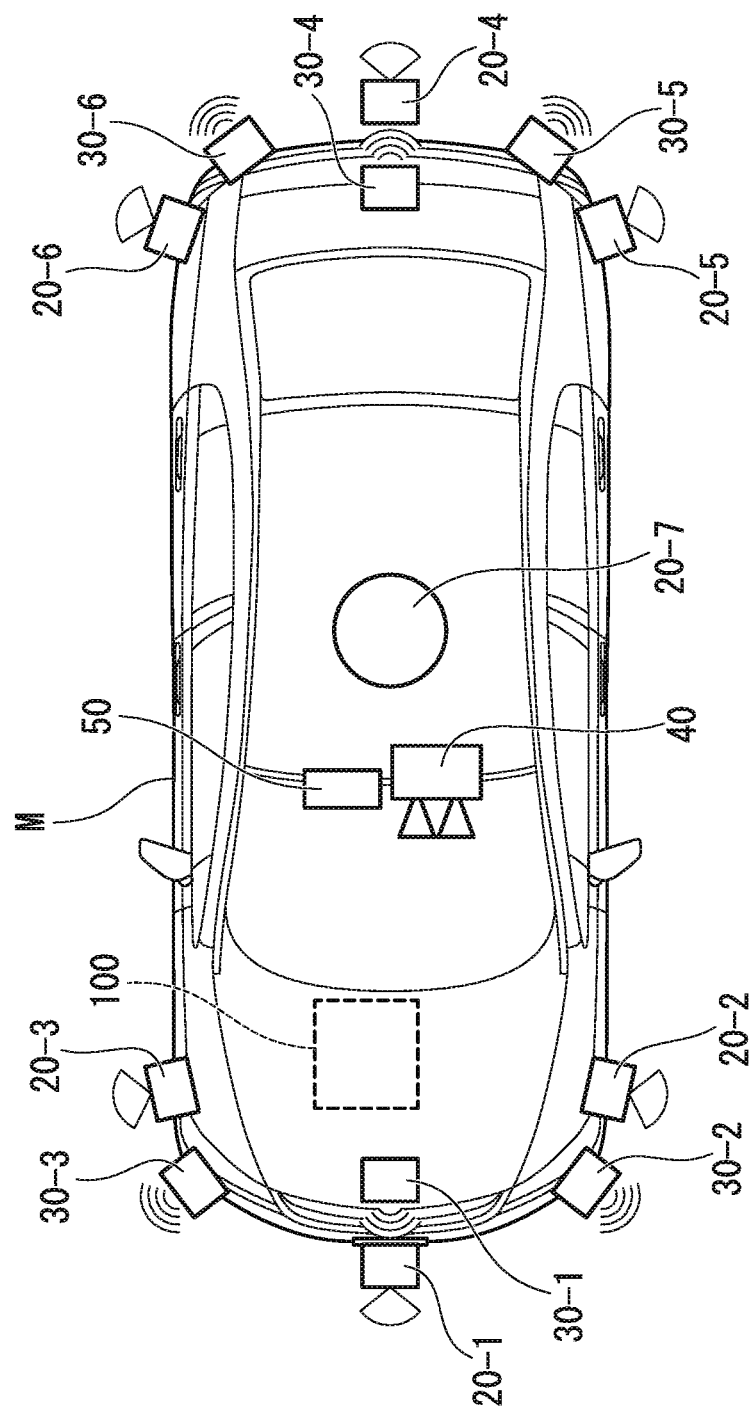
FIG. 1 is a diagram showing components of a subject vehicle M.

FIG. 1 is a diagram showing components included in a vehicle in which a vehicle control system 100 of each embodiment is mounted (hereinafter referred to as a subject vehicle M). The vehicle in which the vehicle control system 100 is mounted is, for example, a two-wheeled car, a three-wheeled car, or a four-wheeled car, examples of which include a car using an internal combustion engine such as a diesel engine or a gasoline engine as a power source, an electric car using an electric motor as a power source, or a hybrid car with an internal combustion engine and an electric motor. Further, the electric car is driven using electric power that is discharged by a battery such as a secondary battery, a hydrogen fuel cell, a metal fuel cell, or an alcohol fuel cell, for example.

As shown in FIG. 1, sensors such as finders 20-1 to 20-7, radars 30-1 to 30-6, and a camera 40, a navigation device 50, and the vehicle control system 100 are mounted in the subject vehicle M.

The finders 20-1 to 20-7 are, for example, light detection and ranging or laser imaging detection and ranging (LIDAR) finders that measure scattered light from irradiation light and measures a distance to a target. For example, the finder 20-1 may be attached to a front grille or the like, and the finders 20-2 and 20-3 may be attached to a side surface of a vehicle body, a door mirror, the inside of a headlight, the vicinity of side lamps, and the like. The finder 20-4 is attached to a trunk lid or the like, and the finders 20-5 and 20-6 are attached to the side surface of the vehicle body, the inside of a taillight, or the like. The finders 20-1 to 20-6 described above have, for example, a detection area of about 150° in a horizontal direction. Further, the finder 20-7 is attached to a roof or the like. The finder 20-7 has, for example, a detection area of 360° in the horizontal direction.

The radars 30-1 and 30-4 described above are, for example, long-distance millimeter-wave radars of which the detection area in a depth direction is wider than those of other radars. Further, the radars 30-2, 30-3, 30-5, and 30-6 are intermediate-distance millimeter wave radars of which the detection area in the depth direction is narrower than those of the radars 30-1 and 30-4.

Hereinafter, the finders 20-1 to 20-7 are simply referred to as a "finder 20" when not particularly distinguished, and the radars 30-1 to 30-6 are simply referred to as a "radar 30" when not particularly distinguished. The radar 30 detects an object using, for example, a frequency modulated continuous wave (FM-CW) scheme.

The camera 40 is, for example, a digital camera using a solid-state imaging element such as a charge coupled device (CCD) or a complementary metal oxide semiconductor (CMOS). The camera 40 is attached to an upper portion of a front windshield, a rear surface of a rearview mirror, or the like. The camera 40 periodically and repeatedly images, for example, in front of the subject vehicle M. The camera 40 may be a stereo camera including a plurality of cameras.

It should be noted that the configuration shown in FIG. 1 is merely an example, and a part of the configuration may be omitted or other components may be added.

Figure 2:
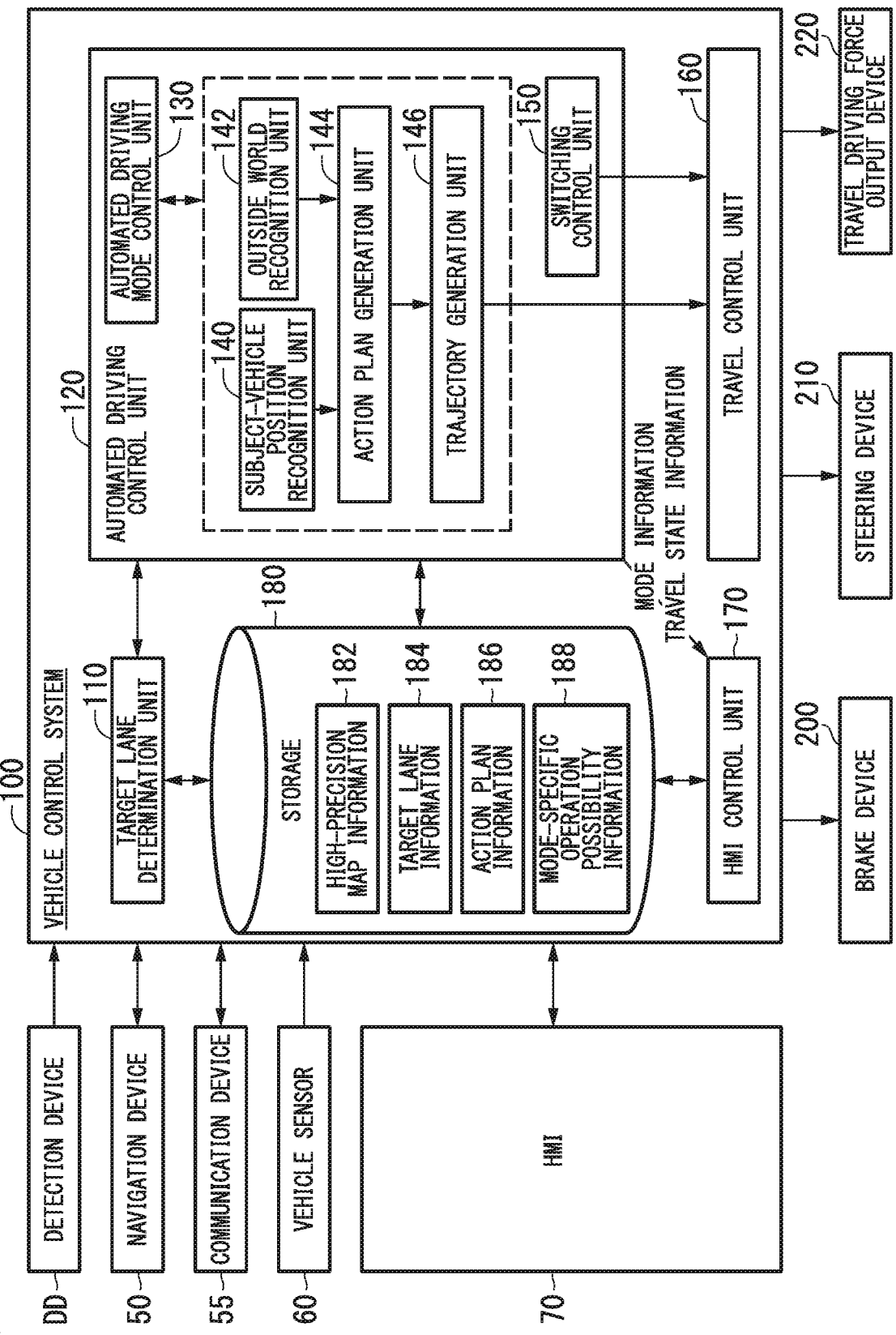
FIG. 2 is a functional configuration diagram centered on a vehicle control system 100.

FIG. 2 is a functional configuration diagram centered on the vehicle control system 100 according to the embodiment. A detection device DD including a finder 20, a radar 30, a camera 40, and the like, a navigation device 50, a communication device 55, a vehicle sensor 60, a human machine interface (HMI) 70, a vehicle control system 100, a travel driving force output device 200, a steering device 210, and a brake device 220 are mounted on the subject vehicle M. These devices or instruments are connected to each other by a multiplex communication line such as a controller area network (CAN) communication line, a serial communication line, or a wireless communication network. It should be noted that a vehicle control system in the claims does not refer only to the "vehicle control system 100" but may include configurations (a detection device DD, the HMI 70, or the like) other than the vehicle control system 100.

The navigation device 50 includes a global navigation satellite system (GNSS) receiver or map information (navigation map), a touch panel type display functioning as a user interface, a speaker, a microphone, and the like. The navigation device 50 specifies a position of the subject vehicle M using the GNSS receiver and derives a route from the position to a destination designated by the user. The route derived by the navigation device 50 is provided to a target lane determination unit 110 of the vehicle control system 100. The position of the subject vehicle M may be specified or supplemented by an inertial navigation system (INS) using the output of the vehicle sensor 60. Further, the navigation device 50 performs guidance through speech or a navigation display for the route to the destination when the vehicle control system 100 is executing the manual driving mode. It should be noted that a configuration for specifying the position of the subject vehicle M may be provided independently of the navigation device 50. Further, the navigation device 50 may be realized, for example, by a function of a terminal device such as a smartphone or a tablet terminal possessed by the user. In this case, transmission and reception of information is performed between the terminal device and the vehicle control system 100 through wireless or wired communication.

The communication device 55 performs wireless communication using, for example, a cellular network, a Wi-Fi network, Bluetooth (registered trademark), dedicated short range communication (DSRC), or the like. The communication device 55 performs, for example, wireless communication with an information provision server of a system monitoring a traffic situation of a road such as Vehicle Information System Communication System (VICS; registered trademark), and acquires information indicating a traffic situation (hereinafter referred to as traffic information) of a road on which the subject vehicle M is traveling or a road on which the subject vehicle M is scheduled to travel. Traffic information includes information such as traffic jam ahead information, a required time at a traffic jam point, information on accidents, broken down vehicles and roadwork, speed regulations and lane regulation information, a parking lot position, and information on availability of a parking lot, a service area, and a parking area. Further, the communication device 55 may communicate with a wireless beacon provided on a side margin or the like of a road or perform inter-vehicle communication with another vehicle traveling around the subject vehicle M to acquire the traffic information.

The vehicle sensors 60 include, for example, a vehicle speed sensor that determines a vehicle speed, an acceleration sensor that determines an acceleration, a yaw rate sensor that determines an angular speed around a vertical axis, and a direction sensor that determines a direction of the subject vehicle M.

Figure 3:
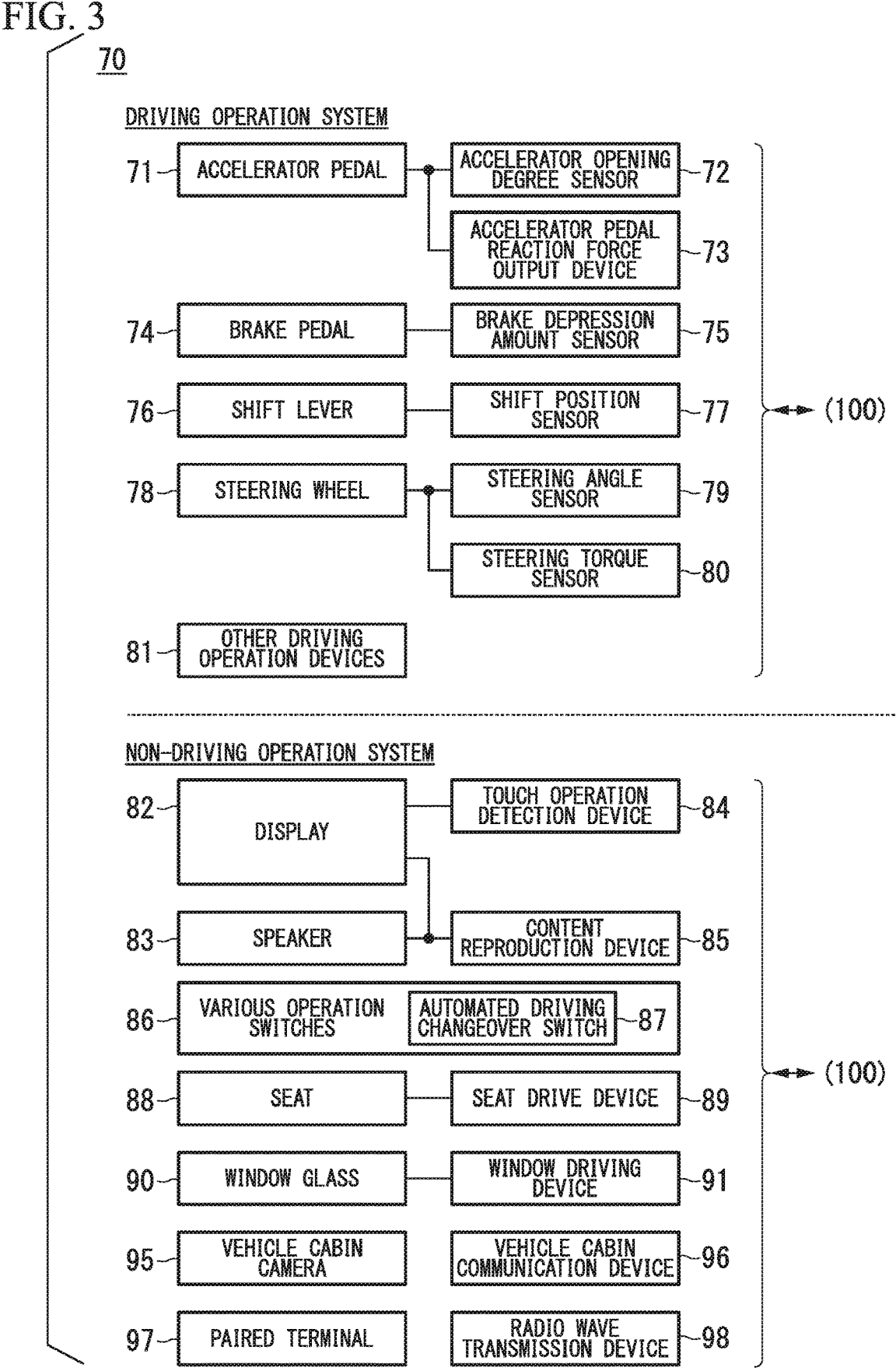
FIG. 3 is a configuration diagram of an HMI 70.

FIG. 3 is a configuration diagram of the HMI 70. The HMI 70 includes, for example, a configuration of a driving operation system and a configuration of a non-driving operation system. A boundary therebetween is not strictly defined, and the configuration of the driving operation system may have a function of the non-driving operation system (or vice versa).

The HMI 70 includes, for example, an accelerator pedal 71, an accelerator opening degree sensor 72, an accelerator pedal reaction force output device 73, a brake pedal 74, a brake depression amount sensor (or a master pressure sensor or the like) 75, a shift lever 76, a shift position sensor 77, a steering wheel 78, a steering angle sensor 79, a steering torque sensor 80, and other driving operation devices 81 as the configuration of the driving operation system.

The accelerator pedal 71 is an operator for receiving an acceleration instruction from the vehicle occupant (or a deceleration instruction according to a return operation). The accelerator opening degree sensor 72 detects the amount of depression of the accelerator pedal 71 and outputs an accelerator opening degree signal indicating the amount of depression to the vehicle control system 100. It should be noted that the accelerator opening degree sensor 72 may directly output the accelerator opening degree signal to the travel driving force output device 200, the steering device 210, or the brake device 220 instead of outputting the accelerator opening degree signal to the vehicle control system 100. The same applies to configurations of other driving operation systems to be described below. The accelerator pedal reaction force output device 73 outputs a force (an operation reaction force) in a direction opposite to an operation direction with respect to the accelerator pedal 71 in response to an instruction from the vehicle control system 100, for example.

The brake pedal 74 is an operator for receiving a deceleration instruction from the vehicle occupant. The brake depression amount sensor 75 determines the amount of depression (or a depression force) of the brake pedal 74 and outputs a brake signal indicating a detection result to the vehicle control system 100.

The shift lever 76 is an operator for receiving an instruction to change a shift stage from the vehicle occupant. The shift position sensor 77 detects a shift stage instructed by the vehicle occupant and outputs a shift position signal indicating a detection result to the vehicle control system 100.

The steering wheel 78 is an operator for receiving a turning instruction from the vehicle occupant. The steering angle sensor 79 detects a steering angle of the steering wheel 78 and outputs a steering angle signal indicating a detection result to the vehicle control system 100. The steering torque sensor 80 determines a torque applied to the steering wheel 78 and outputs a steering torque signal indicating a detection result to the vehicle control system 100.

The other driving operation devices 81 are, for example, a joystick, a button, a dial switch, and a graphical user interface (GUI) switch. The other driving operation devices 81 receive an acceleration instruction, a deceleration instruction, a turning instruction and the like, and output the instructions to the vehicle control system 100.

The HMI 70 includes, for example, a display 82, a speaker 83, a touch operation detection device 84, a content reproduction device 85, various operation switches 86, a seat 88, a seat driving device 89, a window glass 90, a window driving device 91, a vehicle cabin camera 95, a vehicle cabin communication device 96, a paired terminal 97, and a radio wave transmission device 98 as the configuration of the non-driving operation system.

The display 82 is, for example, a liquid crystal display (LCD) or an organic electroluminescence (EL) display attached to each unit of an instrument panel, or an arbitrary place facing a passenger seat or a rear seat. Further, the display 82 may be a head up display (HUD) that projects an image to a front windshield or another window. The speaker 83 outputs sound. When the display 82 is a touch panel, the touch operation detection device 84 detects a contact position (a touch position) on a display screen of the display 82 and outputs the contact position to the vehicle control system 100. When the display 82 is not a touch panel, the touch operation detection device 84 may be omitted.

Examples of the content reproduction device 85 include a digital versatile disc (DVD) reproduction device, a compact disc (CD) reproduction device, a television receiver, and various guidance image generation devices. Some or all of the display 82, the speaker 83, the touch operation detection device 84, and the content reproduction device 85 may be configured by being shared with the navigation device 50.

The various operation switches 86 are disposed at arbitrary places inside a vehicle cabin. The various operation switches 86 include an automated driving changeover switch 87 for instructing starting (or future starting) and stopping of automated driving. The automated driving changeover switch 87 may be any one of a graphical user interface (GUI) switch and a mechanical switch. Further, the various operation switches 86 may include a switch for driving the seat driving device 89 or the window driving device 91.

The seat 88 is a seat on which the vehicle occupant is seated. The seat driving device 89 freely drives a reclining angle, a position in a forward and backward direction, a yaw angle, or the like of the seat 88. The window glass 90 is provided, for example, in each door. The window driving device 91 drives the window glass 90 to open and close the window glass 90.

The vehicle cabin camera 95 is a digital camera using a solid-state imaging element such as a CCD or a CMOS. The vehicle cabin camera 95 is attached at a position at which at least a head of the vehicle occupant who performs a driving operation can be imaged, such as a rearview mirror, a steering boss portion, or the instrument panel. The camera 40, for example, periodically repeatedly images the vehicle occupant.

The vehicle cabin communication device 96, for example, performs wireless communication with a terminal device brought into the vehicle cabin and operable by the vehicle occupant to establish a pairing connection. The terminal device performs wireless communication using, for example, a cellular network, a Wi-Fi network, Bluetooth, or DSRC, similar to the communication device 55. The terminal device is an amusement and entertainment device such as a wireless type mobile game machine, a mobile display, a tablet terminal, a virtual reality (VR) glass, or a head mounted display. The pairing connection with the terminal device may be established by an ad hoc network or may be established by using an existing infrastructure such as the Internet. The vehicle cabin communication device 96 is not limited to pairing connection based on radio waves and may establish a pairing connection with the terminal device through optical wireless communication using infrared rays, a laser, or the like.

The paired terminal 97 is a terminal device of which a pairing connection with the vehicle cabin communication device 96 is established.

Further, the vehicle cabin communication device 96 transmits a warning signal to the paired terminal 97 under the control of the HMI control unit 170. The warning signal is a signal for suppressing some or all of functions of the paired terminal 97 or a signal for notifying the vehicle occupant using the paired terminal 97 of danger. For example, the vehicle cabin communication device 96 may transmit, as the warning signal, a signal for turning off power of the paired terminal 97 or putting the paired terminal 97 into a sleep state, or displaying a warning screen or the like on a screen of the paired terminal 97.

The radio wave transmission device 98 transmits jamming radio waves for jamming communication of the terminal device under the control of the HMI control unit 170. A frequency band of the jamming radio waves is, for example, a frequency band of radio waves that is used in a cellular network (for example, a 2.1 GHz band or a 1.5 GHz band), a frequency band of radio waves that is used in a Wi-Fi network or the like (for example, a 2.4 GHz band or a 5 GHz band), or a frequency band that is the same as that of television broadcast waves.

It should be noted that the vehicle cabin communication device 96 and the radio wave transmission device 98 described above have been described as being independent devices, but the present invention is not limited thereto. Some or all of functions of the vehicle cabin communication device 96 may be included in the radio wave transmission device 98, and some or all of the functions of the radio wave transmission device 98 may be included in the vehicle cabin communication device 96. For example, the pairing connection with the terminal device may be implemented by the radio wave transmission device 98 or the vehicle cabin communication device 96 may transmit the jamming radio wave or the warning signal.

The travel driving force output device 200, the steering device 210, and the brake device 220 will be described before the vehicle control system 100 is described.

The travel driving force output device 200 outputs a travel driving force (torque) for causing the vehicle to travel to a driving wheel. The travel driving force output device 200, for example, includes an engine, a transmission, and an engine electronic control unit (ECU) that controls the engine in a case in which the subject vehicle M is a car using an internal combustion engine as a power source, includes a traveling motor and a motor ECU that controls the traveling motor in a case in which the subject vehicle M is an electric car using an electric motor as a power source, and includes an engine, a transmission, an engine ECU, a traveling motor, and a motor ECU in a case in which the subject vehicle M is a hybrid vehicle. In a case in which the travel driving force output device 200 includes only an engine, the engine ECU adjusts a throttle opening degree of the engine, a gear shift stage, and the like according to information input from a travel control unit 160 to be described below. Further, when the travel driving force output device 200 includes only a traveling motor, the motor ECU adjusts a duty ratio of a PWM signal to be given to the traveling motor according to the information input from the travel control unit 160. When the travel driving force output device 200 includes an engine and a traveling motor, the engine ECU and the motor ECU cooperate with each other to control the travel driving force according to the information input from the travel control unit 160.

The steering device 210 includes, for example, a steering ECU and an electric motor. The electric motor, for example, changes a direction of the steerable wheels by applying a force to a rack and pinion mechanism. The steering ECU drives the electric motor according to information input from the vehicle control system 100 or input information on the steering angle or the steering torque, to change directions of the steerable wheels.

The brake device 220 is, for example, an electric servo brake device including a brake caliper, a cylinder that transfers hydraulic pressure to the brake caliper, an electric motor that generates the hydraulic pressure in the cylinder, and a brake control unit. The brake control unit of the electric servo brake device controls the electric motor according to the information input from the travel control unit 160 so that a brake torque according to the braking operation is output to each wheel. The electric servo brake device may include, as a backup, a mechanism for transferring the hydraulic pressure generated by the operation of the brake pedal to the cylinder via a master cylinder. It should be noted that the brake device 220 is not limited to the electric servo brake device described above and may be an electronically controlled hydraulic brake device. The electronically controlled hydraulic brake device controls an actuator according to the information input from the travel control unit 160 and transfers the hydraulic pressure of the master cylinder to the cylinder. Further, the brake device 220 may include a regenerative brake using a traveling motor that may be included in the travel driving force output device 200.

[Vehicle Control System]

Hereinafter, the vehicle control system 100 will be described. The vehicle control system 100 is realized by, for example, one or more processors or hardware having equivalent functions. The vehicle control system 100 may have a configuration in which, for example, a processor such as a central processing unit (CPU), a storage device, an electronic control unit (ECU) having a communication interface connected by an internal bus, and a micro-processing unit (MPU) are combined.

In FIG. 2, the vehicle control system 100 includes, for example, the target lane determination unit 110, an automated driving control unit 120, a travel control unit 160, an HMI control unit 170, and a storage 180. The automated driving control unit 120 includes, for example, an automated driving mode control unit 130, a subject-vehicle position recognition unit 140, an outside world recognition unit 142, an action plan generation unit 144, a trajectory generation unit 146, and a switching control unit 150. A combination of the detection device DD, the communication device 55, and the outside world recognition unit 142 is an example of a "recognition unit". Further, the automated driving mode control unit 130 and the HMI control unit 170 are an example of a "management unit".

Some or all of each of the target lane determination unit 110, each unit of the automated driving control unit 120, and the travel control unit 160 are realized by the processor executing a program (software).

Further, some or all of the units may be realized by hardware such as a large scale integration (LSI) or an application specific integrated circuit (ASIC) or may be realized by a combination of software and hardware.

Information such as high-precision map information 182, target lane information 184, action plan information 186, and the mode-specific operation possibility information 188, for example, is stored in the storage 180. The storage 180 is realized by a read only memory (ROM), a random access memory (RAM), a hard disk drive (HDD), a flash memory, or the like. The program to be implemented by the processor may be stored in the storage 180 in advance or may be downloaded from an external device via an in-vehicle Internet facility or the like. Further, the program may be installed in the storage 180 by a portable storage medium having the program stored therein being mounted on a driving device (not shown). Further, the vehicle control system 100 may be distributed by a plurality of computer devices.

The target lane determination unit 110 is realized by, for example, an MPU. The target lane determination unit 110 divides the route provided from the navigation device 50 into a plurality of blocks (for example, divides route every 100 [m] in a vehicle traveling direction), and determines the target lane for each block by referring to the high-precision map information 182. The target lane determination unit 110, for example, determines the lane from the left in which the subject vehicle is traveling. The target lane determination unit 110 determines, for example, the target lane so that the subject vehicle M can travel on a reasonable traveling route for traveling to a branch destination when a branch place or a merging place exists in the route. The target lane determined by the target lane determination unit 110 is stored in the storage 180 as the target lane information 184.

The high-precision map information 182 is map information with higher precision than that of the navigation map included in the navigation device 50. The high-precision map information 182 is, for example, information on a center of a lane or information on boundaries of a lane. The high-precision map information 182 may include road information, traffic regulations information, address information (address and postal code), facilities information, telephone number information, and the like. The road information includes information indicating types of road such as expressways, toll roads, national highways, and prefectural roads, or information such as the number of lanes on a road, a width of respective lanes, a gradient of a road, a position of a road (three-dimensional coordinates including a longitude, a latitude, and a height), a curvature of a curve of a lane, a position of a merging or branching point of a lane, and a sign provided on a road. The traffic regulations information includes information such as lane closures due to roadwork, traffic accidents, traffic jams, or the like.

The automated driving mode control unit 130 determines an automated driving mode to be implemented by the automated driving control unit 120. The automated driving mode in the first embodiment includes the following modes. It should be noted that the following is merely an example, and the number of automated driving modes may be arbitrarily determined.

[Mode A]

Mode A is a mode in which a degree of automated driving is highest. When mode A is implemented, all vehicle controls such as complicated merging control are automatically implemented, and therefore, the vehicle occupant has the lowest level of surroundings monitoring obligation. In this level, the vehicle occupant does not have to monitor surroundings or a state of the subject vehicle M (there is no surroundings monitoring obligation).

Here, travel states to be selected in the mode A include, for example, vehicle platooning. This travel state is determined by the travel state determination unit 146A included in the trajectory generation unit 146 to be described below. The vehicle platooning is a travel state in which the subject vehicle M tracks a travel trajectory of the preceding vehicle that the subject vehicle M follows, and travels on the travel trajectory of the preceding vehicle or near the travel trajectory of the preceding vehicle. The travel trajectory may be recognized by the outside world recognition unit 142 on the basis of a detection result of the detection unit DD or may be acquired from the preceding vehicle via the communication device 55 (a "trajectory" to be described below may be acquired from the preceding vehicle instead of being generated in the subject vehicle M).

In the vehicle platooning, a speed of the subject vehicle M is determined to be equal to a speed of the preceding vehicle. In such a case, the subject vehicle M and the preceding vehicle form one line (a group of vehicles). Therefore, the subject vehicle M, which is a subsequent vehicle in the line, can perform automated driving while mainly monitoring motions of the preceding vehicle, and vehicles approaching from the side or the rear, which reduces a load on control.

Further, the travel state to be selected in the mode A may include a travel state such as low-speed following traveling, in addition to the vehicle platooning. The low-speed following traveling is, for example, a travel state in which the subject vehicle M follows a preceding vehicle traveling in front of (directly in front of) the subject vehicle M on a subject lane on which the subject vehicle M travels on a crowded highway. The low-speed following traveling is also referred to as traffic jam pilot (TJP). In various travel states such as the vehicle platooning and the low-speed following traveling, for example, a speed limit of about 40 km/h is provided, and when this speed limit is exceeded, the mode is down by one and is shifted to a mode B.

[Mode B]

Mode B is a mode in which the degree of automated driving is high next to mode A. When mode B is implemented, x all the vehicle controls are automatically implemented in principle, but the driving operation of the subject vehicle M is entrusted to the vehicle occupant according to situations. Therefore, the surrounding monitoring obligation level is set to a level at which the degree of the surroundings monitoring obligation is high next to the level in the mode A. At this level, it is necessary for the vehicle occupant to monitor the surroundings or state of the subject vehicle M (the surroundings monitoring obligation is increased as compared with the mode A). In various travel states to be selected in the mode B, for example, a speed limit of about 70 km/h is provided. When this speed limit is exceeded, the mode is down by one and is shifted to a mode C.

[Mode C]

Mode C is a mode with a high degree of automated driving next to mode B. When the mode C is being implemented, the vehicle occupant needs to perform a confirmation operation with respect to the HMI 70 according to the situation. Therefore, the surroundings monitoring obligation level is set to a level higher in a degree of the surroundings monitoring obligation next to the level in the mode B. In the mode C, for example, the vehicle occupant is notified of a timing of lane change, and when the vehicle occupant has implemented an operation to instruct the HMI 70 to change the lane, automatic lane change is implemented. Therefore, at the level in the mode C, it is necessary for the vehicle occupant to monitor surroundings or a state of the subject vehicle M. In various travel states to be selected in the mode C, for example, a speed limit of about 100 km/h is provided. When the speed limit is exceeded, the mode is down by one and is shifted to, for example, a mode lower than the mode C or a manual driving mode.

The automated driving mode control unit 130 determines the automated driving mode to one of the above modes on the basis of an operation of the vehicle occupant with respect to the HMI 70, the event determined by the action plan generation unit 144, the travel state determined by the trajectory generation unit 146 (the travel state determination unit 146A), and the like. The automated driving mode control unit 130 notifies the HMI control unit 170 of information on the determined automated driving mode.

It should be noted that the automated driving modes that can be selected by the automated driving mode control unit 130 may be restricted according to, for example, performance of the detection device DD of the subject vehicle M. For example, when the performance of the detection device DD becomes lower than a reference value due to failure of some sensors included in the detection device DD or when the number of sensors of the detection device DD is smaller than a certain number due to, for example, removal of sensors on the rear end side of the vehicle, the automated driving modes may be restricted such that some of the automated driving modes (for example, the mode A with the highest degree of automated driving) cannot be selected in consideration of safety.

The automated driving mode control unit 130 may perform switching (overriding) from the automated driving mode to the manual driving mode according to an operation with respect to the configuration of the driving operation system in the HMI 70 in any of the automated driving modes. The overriding is started, for example, when a state in which an operation force of the vehicle occupant of the subject vehicle M with respect to the driving operation system of the HMI 70 exceeds a threshold value continues for a predetermined time or more, when the amount of change in the operation is equal or larger than a predetermined amount of change in the operation (for example, an accelerator opening degree of the accelerator pedal 71, the amount of brake depression of the brake pedal 74, or a steering wheel angle of the steering wheel 78), or when the operation with respect to the driving operation system has been implemented a predetermined number of times or more.

Further, the automated driving mode control unit 130 may switch the driving mode from the automated driving mode currently being implemented to another automated driving mode (for example, from mode A to mode B) at a timing at which the travel state in each automated driving mode ends or may switch the driving mode to another travel state that can be selected in the automated driving mode currently being implemented.

In a case in which when the travel state is changed from another travel state such as constant speed traveling other than the vehicle platooning to the vehicle platooning when each automated driving mode is being implemented, the automated driving mode control unit 130 treats the automated driving mode currently being implemented, as a changed mode with a higher degree of automated driving than the automated driving mode implemented at the other travel state.

Further, in a case in which the travel state is changed from another travel state such as constant speed traveling other than the vehicle platooning to the vehicle platooning when each automated driving mode is being implemented, the automated driving mode control unit 130 may change the automated driving mode being currently implemented, into the mode A in which the degree of the surrounding monitoring obligation is lowest among all the automated driving modes.

For example, in a case in which the travel state is changed from the constant speed traveling to the vehicle platooning when the mode B is being implemented, the automated driving mode control unit 130 changes the automated driving mode from the mode B to mode A in which the degree of the surroundings monitoring obligation is lower. Accordingly, when the subject vehicle M follows a nearby vehicle, the vehicle occupant does not need to monitor the surroundings (or the necessity becomes low) and can freely operate a terminal device brought into the vehicle, the content reproduction device 85 installed in the vehicle cabin, and the like.

Further, when the travel state is vehicle platooning, a leading vehicle of the line can be regarded as recognizing a surroundings situation instead of the subject vehicle M. In other words, the subject vehicle M can be regarded as indirectly recognizing the surroundings situation by monitoring the leading vehicle of the line or a vehicle following the leading vehicle. In this case, the automated driving mode control unit 130, for example, may change the automated driving mode to be implemented into an automated driving mode to which switching is restricted, under a situation that the number of sensors of the detection device DD is not sufficient and switching to some automated driving mode is restricted.

For example, in a case in which the travel state is changed to the vehicle platooning when the mode B in which the degree of the surroundings monitoring obligation is low is implemented at the next point in a situation in which the mode A is restricted, the automated driving mode control unit 130 may change the automated driving mode to be implemented, from the mode B to the mode A.

In addition, when the travel state is changed from the other travel state other than the vehicle platooning to the vehicle platooning, the automated driving mode control unit 130 relaxes the upper vehicle speed limit, which can be restricted, set for each automated driving mode. Accordingly, the relative speed limit for the surroundings monitoring obligation of the subject vehicle M is suppressed.

For example, a case in which the travel state is changed from low-speed following traveling to vehicle platooning when low-speed following traveling is included as a travel state selectable in mode A, in addition to vehicle platooning is considered. The degree (level) of the surroundings monitoring obligation of these traveling is controlled to be the same, or controlled so that the level of the surroundings monitoring obligation during vehicle platooning is lower. On the other hand, the speed limit during the vehicle platooning is set to be gradual. For example, the speed limit during low-speed following traveling is, for example, about 40 km/h, whereas the speed limit during vehicle platooning is set to, for example, 100 km/h. Therefore, during vehicle platooning, the relative speed limit for the surroundings monitoring obligation of the subject vehicle M is suppressed. Such a relationship is not limited to the low-speed following traveling and is satisfied between the other travel state and vehicle platooning.

The subject-vehicle position recognition unit 140 of the automated driving control unit 120 recognizes a lane (traveling lane) in which the subject vehicle M is traveling, and a relative position of the subject vehicle M with respect to the traveling lane, on the basis of the high-precision map information 182 stored in the storage 180, and information input from the finder 20, the radar 30, the camera 40, the navigation device 50, or the vehicle sensor 60.

The subject-vehicle position recognition unit 140 compares, for example, a pattern of a road division line (for example, an arrangement of a solid line and a broken line) recognized from the high-precision map information 182 with a pattern of a road division line around the subject vehicle M recognized from an image captured by the camera 40 to recognize the traveling lane. In this recognition, the position of the subject vehicle M acquired from the navigation device 50 or a processing result by an INS may be added.

Figure 4:
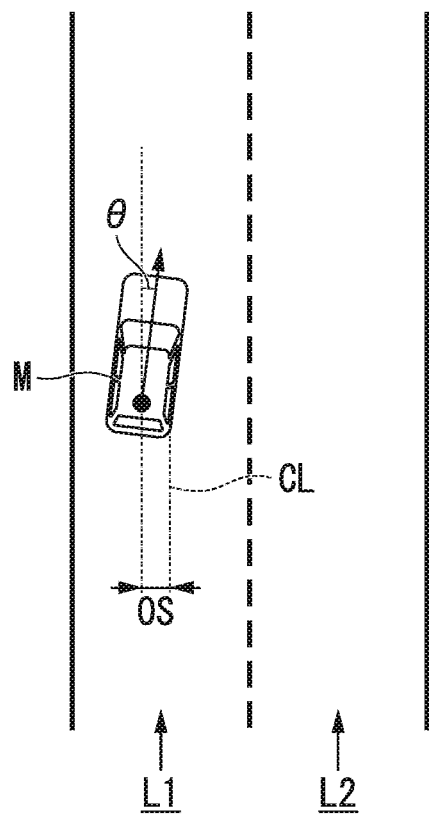
FIG. 4 is a diagram showing a state in which a relative position of a subject vehicle M with respect to a travel lane L1 is recognized by a subject-vehicle position recognition unit 140.

FIG. 4 is a diagram showing a state in which the relative position of the subject vehicle M with respect to the travel lane L1 is recognized by the subject-vehicle position recognition unit 140. The subject-vehicle position recognition unit 140, for example, may recognize a deviation OS of a reference point (for example, a centroid) of the subject vehicle M from a travel lane center CL, and an angle θ with respect to a connecting line along the travel lane center CL in the travel direction of the subject vehicle M, as the relative position of the subject vehicle M with respect to a travel lane L1. It should be noted that, instead of this, the subject-vehicle position recognition unit 140 may recognize, for example, the position of the reference point of the subject vehicle M with respect to any one side end portion of the subject lane L1 as the relative position of the subject vehicle M with respect to the travel lane. The relative position of the subject vehicle M recognized by the subject-vehicle position recognition unit 140 is provided to the target lane determination unit 110.

The outside world recognition unit 142 recognizes a state such as a position, a speed, and an acceleration of a nearby vehicle on the basis of information input from the finder 20, the radar 30, the camera 40, and the like. The nearby vehicle is, for example, a vehicle that is traveling nearby the subject vehicle M and is a vehicle that travels in the same direction as that of the subject vehicle M. The position of the nearby vehicle may be represented by a representative point such as a centroid or a corner of another vehicle or may be represented by an area represented by an outline of another vehicle. The "state" of the nearby vehicle may include an acceleration of the nearby vehicle, and an indication of whether or not the nearby vehicle is changing lane (or whether or not the nearby vehicle is about to change lane), which are recognized on the basis of the information of the various devices described above. Further, the outside world recognition unit 142 may also recognize positions of a guardrail, a utility pole, a parked vehicle, a pedestrian, and other objects, in addition to nearby vehicles.

The action plan generation unit 144 sets a starting point of automated driving and/or a destination for automated driving. The starting point of automated driving may be a current position of the subject vehicle M or may be a point at which an operation for instructing automated driving is implemented. The action plan generation unit 144 generates the action plan in a section between the starting point and the destination of automated driving. It should be noted that the present invention is not limited thereto, and the action plan generation unit 144 may generate the action plan for any section.

The action plan includes, for example, a plurality of events that are implemented sequentially. Examples of the events include a deceleration event for decelerating the subject vehicle M, an acceleration event for accelerating the subject vehicle M, a lane keeping event for causing the subject vehicle M to travel so that the subject vehicle M does not deviate from a travel lane, a lane change event for changing travel lane, an overtaking event for causing the subject vehicle M to overtake a preceding vehicle, a branching event for changing a lane to a desired lane at a branch point or causing the subject vehicle M to travel so that the subject vehicle M does not deviate from a current travel lane, a merging event for accelerating and decelerating the subject vehicle M at a merging lane for merging into a main lane and changing travel lane, and a handover event in which the driving mode is shifted from the manual driving mode to the automated driving mode at a start point of automated driving or the driving mode is shifted from the automated driving mode to the manual driving mode at a scheduled end point of automated driving. The action plan generation unit 144 sets a lane change event, a branching event, or a merging event at a place at which the target lane determined by the target lane determination unit 110 is switched. Information indicating the action plan generated by the action plan generation unit 144 is stored in the storage 180 as the action plan information 186.

Figure 5:
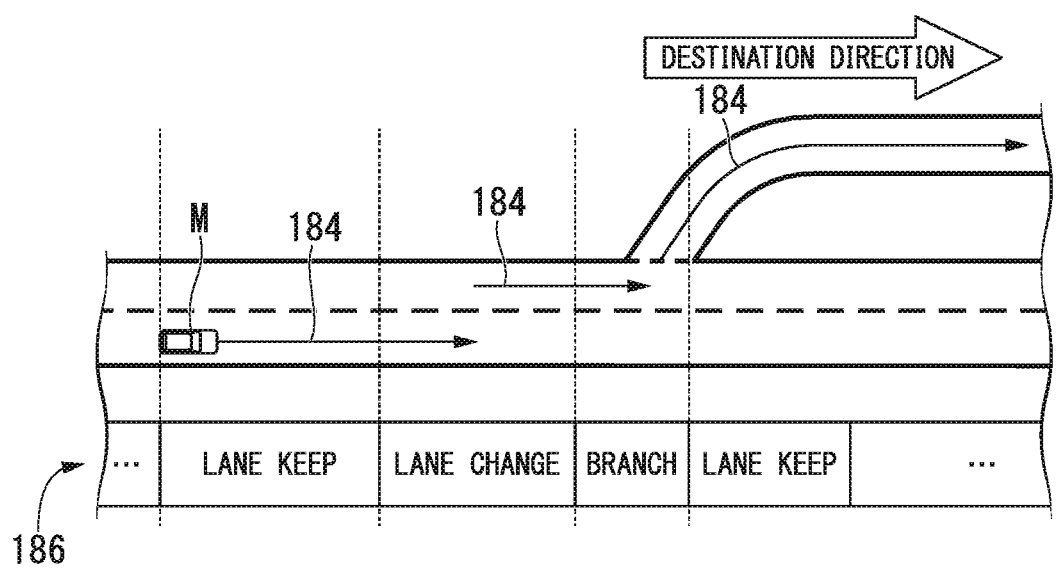
FIG. 5 is a diagram showing an example of an action plan generated for a certain section.

FIG. 5 is a diagram showing an example of an action plan generated for a certain section. As shown in FIG. 5, the action plan generation unit 144 generates an action plan necessary for the subject vehicle M to travel on the target lane indicated by the target lane information 184. It should be noted that the action plan generation unit 144 may dynamically change the action plan irrespective of the target lane information 184 according to a situation change of the subject vehicle M. For example, when the speed of the nearby vehicle recognized by the outside world recognition unit 142 exceeds a threshold value during vehicle traveling or a moving direction of the nearby vehicle traveling in the lane adjacent to the subject lane is directed to a direction of the subject lane, the action plan generation unit 144 may change an event set in a driving section in which the subject vehicle M is scheduled to travel. For example, in a case in which an event is set so that a lane change event is implemented after a lane keeping event, when it has been found from a result of the recognition of the outside world recognition unit 142 that a vehicle travels at a speed equal to or higher than a threshold value from behind in a lane that is a lane change destination during the lane keeping event, the action plan generation unit 144 may change an event subsequent to the lane keeping event from a lane change event to a deceleration event, a lane keeping event, or the like. As a result, even when a change occurs in a state of the outside world, the vehicle control system 100 can cause the subject vehicle M to safely automatically travel.

Figure 6:
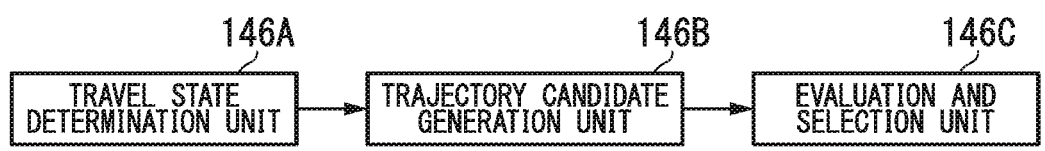
FIG. 6 is a diagram showing an example of a configuration of a trajectory generation unit 146.

FIG. 6 is a diagram showing an example of a configuration of the trajectory generation unit 146. The trajectory generation unit 146 includes, for example, a travel state determination unit 146A, a trajectory candidate generation unit 146B, and an evaluation and selection unit 146C.

When a lane keeping event is implemented, the travel state determination unit 146A determines the travel state to be any one of constant speed traveling, low-speed following traveling, medium-speed following traveling, high-speed following traveling, decelerating traveling, curved traveling, obstacle avoidance traveling, vehicle platooning, and the like on the basis of the nearby vehicle recognized by the outside world recognition unit 142.

For example, when there are no other vehicles within a certain distance in front of the subject vehicle M, the travel state determination unit 146A determines the travel state to be constant speed traveling. For example, when the speed of the nearby vehicle (for example, the preceding vehicle) is equal to or higher than the speed limit of the mode A and is equal to or lower than the speed limit of the mode B and an inter-vehicle distance up to the nearby vehicle is equal to or greater than a certain value, the travel state determination unit 146A determines, for example, the travel state to be constant speed traveling in the mode B described above.

Further, the travel state determination unit 146A determines the travel state to be low-speed following traveling in a traffic jam situation or the like. In addition, when the average speed of the nearby vehicle is higher than that in the traffic jam situation, the travel state determination unit 146A determines the travel state to be medium-speed following traveling or high-speed following traveling. For example, when the speed of the nearby vehicle (for example, the preceding vehicle) recognized by the outside world recognition unit 142 is equal to or lower than the speed limit of the mode A and the inter-vehicle distance up to the nearby vehicle is equal to or greater than the certain value, the travel state determination unit 146A determines, for example, the travel state to be low-speed following traveling in the mode A described above.

When various following traveling is implemented, lane change, merging, branching, or the like is implemented at a timing based on the action plan generated by the action plan generation unit 144.

Further, when the outside world recognition unit 142 recognizes deceleration of the preceding vehicle or when an event such as stopping or parking is implemented, the travel state determination unit 146A determines the travel state to be decelerating traveling. Further, when the outside world recognition unit 142 recognizes that the subject vehicle M has arrived at a curved road, the travel state determination unit 146A determines the travel state to be curved traveling. Further, when an obstacle is recognized in front of the subject vehicle M by the outside world recognition unit 142, the travel state determination unit 146A determines the travel state to be obstacle avoidance traveling.

Further, when there is a vehicle having the same destination or a vehicle having partially the same route to the destination among nearby vehicles recognized by the outside world recognition unit 142, the travel state determination unit 146A determines the travel state to be vehicle platooning. At the time of vehicle platooning, the subject vehicle M follows the vehicle having the same destination or the vehicle having partially the same route to the destination, and performs vehicle control for an event that is the same as an event that is implemented by the vehicle that the subject vehicle M follows, without depending on the action plan generated by the action plan generation unit 144.

Figure 7:
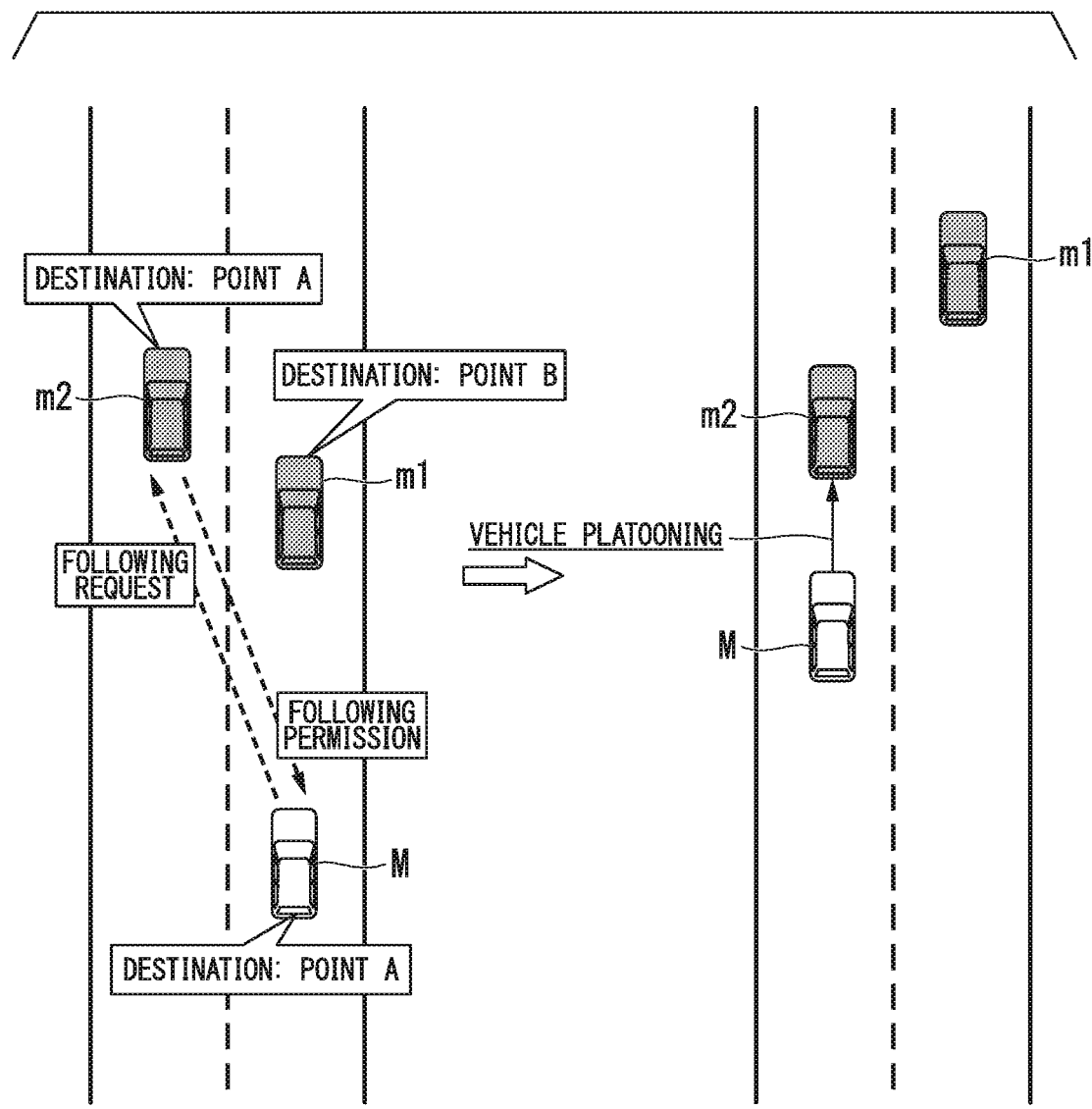
FIG. 7 is a diagram showing an example of a situation in which a travel condition is changed to vehicle platooning.

FIG. 7 is a diagram showing an example of a situation in which the travel state is changed to the vehicle platooning. In the shown example, a state in which, when the subject vehicle M follows a vehicle m1, the subject vehicle M changes a vehicle that is a following target to a vehicle m2 traveling on an adjacent lane and performs the vehicle platooning is shown. For example, the travel state determination unit 146A performs vehicle-to-vehicle communication with a nearby vehicle traveling in a communication possible range of the communication device 55 using the communication device 55, and acquires destination information indicating a set destination and position information of a vehicle that is a communication target from each nearby vehicle. In the shown example, the travel state determination unit 146A acquires destination information and position information from each of the vehicle m1 and the vehicle m2.

The travel state determination unit 146A specifies a nearby vehicle (hereinafter referred to as a "companion vehicle") set to have the same destination as the destination of the subject vehicle M set for the navigation device 50 from the vehicles that are communication targets of the communication device 55 by referring to the destination information. In the shown example, since the destination of the vehicle m1 is different from the destination of the subject vehicle M, and the destination of the vehicle m2 is the same as the destination of the subject vehicle M, the vehicle m2 is specified as the companion vehicle. It should be noted that, when there are a plurality of companion vehicles, the travel state determination unit 146A may set a vehicle closest to the subject vehicle M as the companion vehicle that is a following target by referring to the position information of each nearby vehicle.

Further, when there is no companion vehicle among the vehicles that are communication targets of the communication device 55, the travel state determination unit 146A specifies a vehicle having the same route up to a stopover point (a relay point) in a route up to a destination of the subject vehicle M. When a following vehicle specifying unit 146D specifies a vehicle having the same route up to the relay point, that is, when the following vehicle specifying unit 146D specifies a vehicle having a different destination but having partially the same route up to the destination, the following vehicle specifying unit 146D treats this vehicle as the companion vehicle.

After the companion vehicle is specified, the travel state determination unit 146A transmits following request information to the companion vehicle using the communication device 55. When the companion vehicle (the vehicle m2 in the shown example) receives the following request information, the companion vehicle displays information indicating that there is a following request from another vehicle on a display or the like in a vehicle cabin. When a vehicle occupant of the companion vehicle permits the following using a predetermined user interface in response to the request, the companion vehicle transmits following permission information indicating that the following request has been approved to the subject vehicle M. When the following permission information is received by the communication device 55, the travel state determination unit 146A determines the travel state to be vehicle platooning so that the subject vehicle M follows the companion vehicle. It should be noted that the communication device 55 may receive information on an action plan or a travel trajectory generated by the companion vehicle together with the following permission information from the companion vehicle. In this case, the trajectory generation unit 146 may generate a travel trajectory based on the action plan received from the companion vehicle or may treat the travel trajectory received from the companion vehicle as the generated trajectory.

In addition, when not only a lane keep event but also a lane change event, an overtaking event, a branching event, a merging event, a handover event, or the like is implemented, the travel state determination unit 146A determines the travel state according to each event.

The travel state determination unit 146A notifies the HMI control unit 170 of information on the travel state determined for each event.

Figure 8:
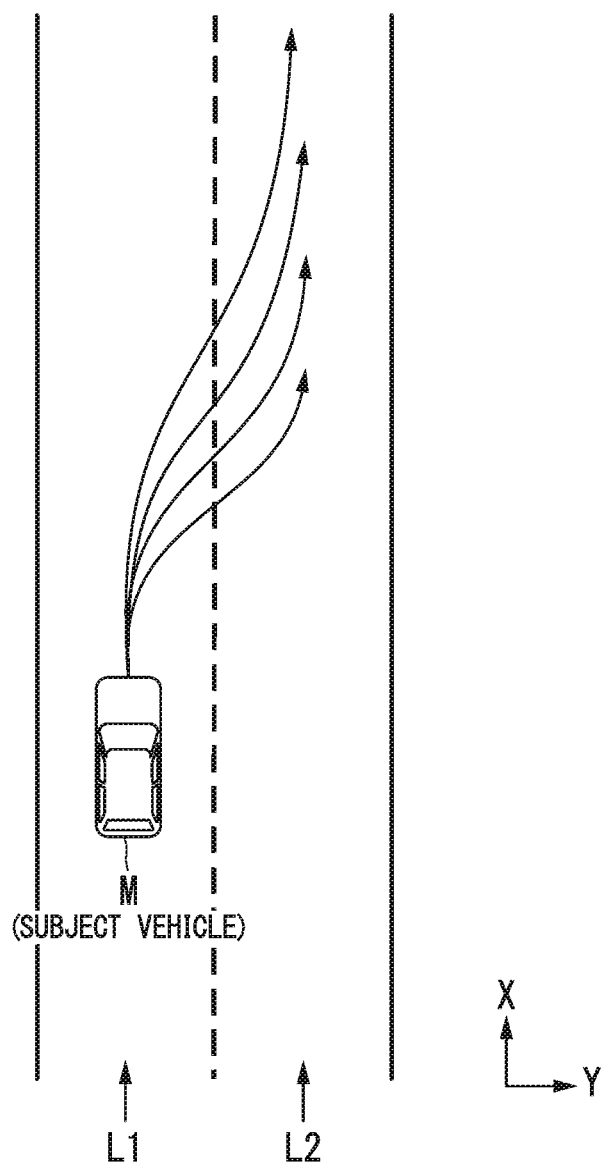
FIG. 8 is a diagram showing an example of candidates for a trajectory generated by a trajectory candidate generation unit 146B.

The trajectory candidate generation unit 146B generates candidates for the trajectory on the basis of the travel state determined by the travel state determination unit 146A. FIG. 8 is a diagram showing an example of candidates for the trajectory generated by the trajectory candidate generation unit 146B. An example shown in FIG. 8 shows candidates for the trajectory generated when the subject vehicle M changes the lane from the lane L1 to the lane L2.

Figure 9:
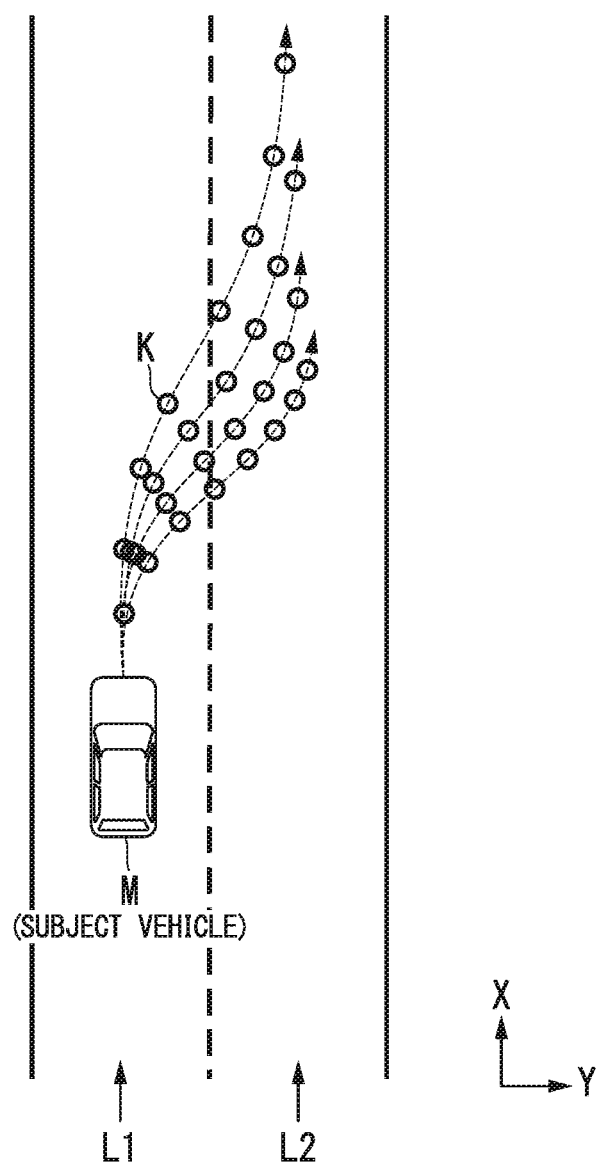
FIG. 9 is a diagram in which the candidates for the trajectory generated by the trajectory candidate generation unit 146B are expressed by trajectory points K.

The trajectory candidate generation unit 146B determines the trajectory as shown in FIG. 8, for example, to be a collection of the target positions (the trajectory points K) that the reference position (for example, a centroid or a rear wheel shaft center) of the subject vehicle M should reach at every predetermined time in the future. FIG. 9 is a diagram in which the candidate for the trajectory generated by the trajectory candidate generation unit 146B is represented by the trajectory points K. When an interval between the trajectory points K is wider, the speed of the subject vehicle M becomes higher, and when the interval between the trajectory points K is narrower, the speed of the subject vehicle M becomes lower. Therefore, the trajectory candidate generation unit 146B gradually widens the interval between the trajectory points K when acceleration is desired, and gradually narrows the interval between the trajectory points when deceleration is desired.

Thus, since the trajectory point K includes a speed component, the trajectory candidate generation unit 146B needs to give a target speed to each trajectory point K. The target speed is determined according to the travel state determined by the travel state determination unit 146A.

Figure 10:
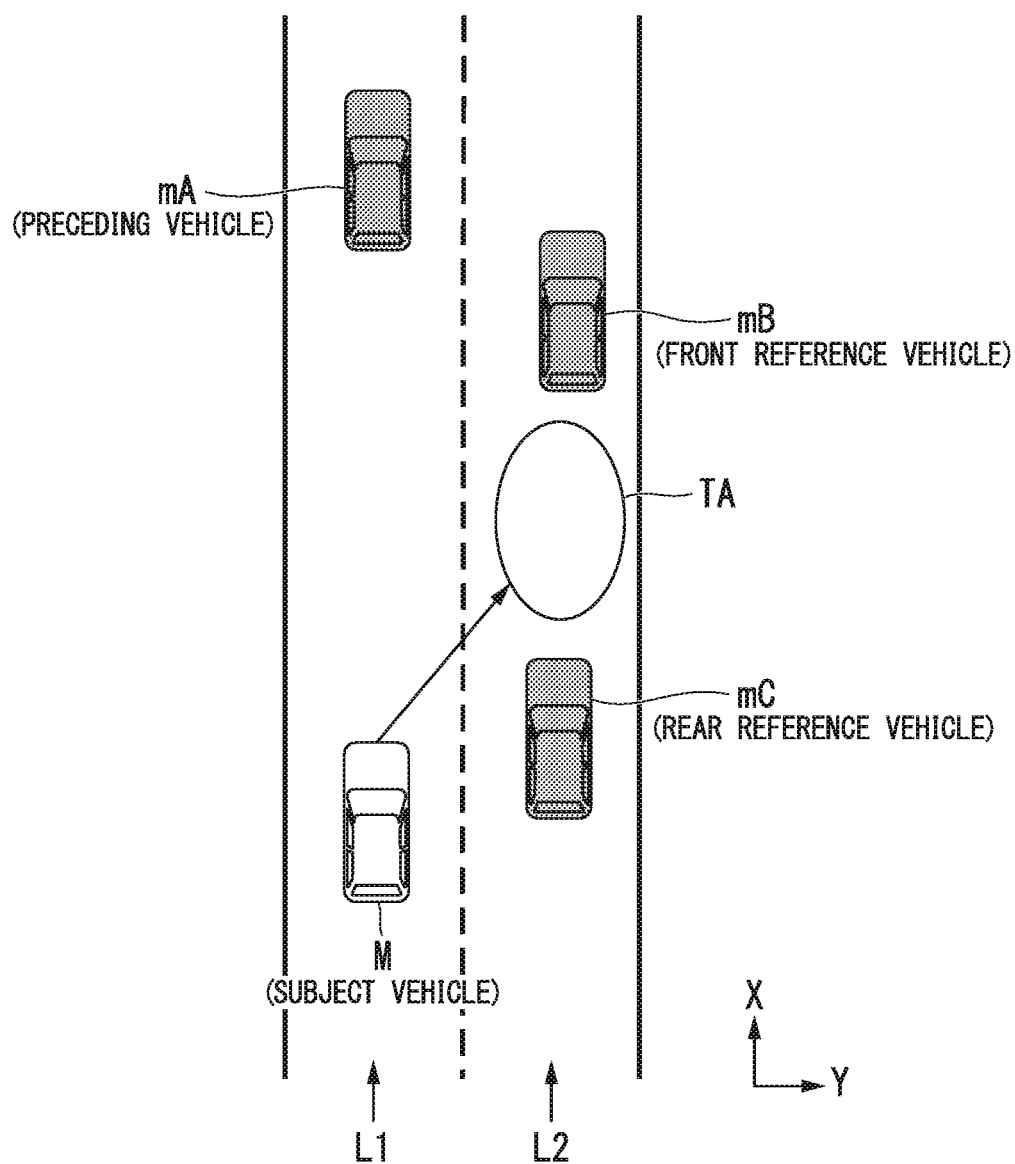
FIG. 10 is a diagram showing a lane changing target position TA.

A scheme of determining the target speed when lane change (including branching) is implemented will be described herein. The trajectory candidate generation unit 146B first sets a lane changing target position (or a merging target position). The lane changing target position is set as a relative position with respect to the nearby vehicle and is used for a determination as to "whether the lane change is implemented between the subject vehicle and a certain nearby vehicle". The trajectory candidate generation unit 146B determines the target speed when the lane change is implemented while focusing on three nearby vehicles with reference to the lane changing target position. FIG. 10 is a diagram showing the lane changing target position TA. In FIG. 10, L1 indicates the subject lane, and L2 indicates an adjacent lane. Here, a nearby vehicle traveling in front of the subject vehicle M on the same lane as that of the subject vehicle M is referred to as a preceding vehicle mA, a nearby vehicle traveling immediately before the lane changing target position TA is referred to as a front reference vehicle mB, and a nearby vehicle traveling immediately after the lane changing target position TA is referred to as a rear reference vehicle mC. The subject vehicle M needs to perform acceleration or deceleration in order to move to the side of the lane changing target position TA, but should avoid catching up with the preceding vehicle mA in this case. Therefore, the trajectory candidate generation unit 146B predicts a future state of the three nearby vehicles and determines a target speed so that the subject vehicle M does not interfere with each nearby vehicle.

Figure 11:
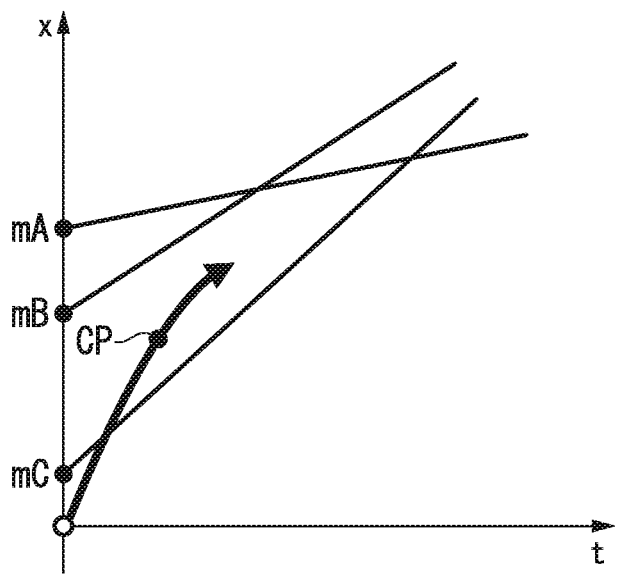
FIG. 11 is a diagram showing a speed generation model when speeds of three nearby vehicles are assumed to be constant.

FIG. 11 is a diagram showing a speed generation model when speeds of three nearby vehicles are assumed to be constant. In FIG. 11, straight lines extending from mA, mB, and mC indicate displacements in the traveling direction when each nearby vehicle is assumed to travel at a constant speed. The subject vehicle M should be between the front reference vehicle mB and the rear reference vehicle mC at a point CP at which the lane change is completed and should be behind the preceding vehicle mA before that. Under such restrictions, the trajectory candidate generation unit 146B derives a plurality of time-series patterns of the target speed until the lane change is completed. The trajectory candidate generation unit 146B derives a plurality of trajectory candidates as shown in FIG. 9 by applying the time-series patterns of the target speed to a model such as a spline curve. It should be noted that a motion pattern of the three nearby vehicles is not limited to the constant speed as shown in FIG. 11, but the prediction may be implemented on the premise of constant acceleration and constant jerk.

The evaluation and selection unit 146C performs evaluation on the trajectory candidates generated by the trajectory candidate generation unit 146B, for example, from two viewpoints including planning and safety, and selects a trajectory to be output to the travel control unit 160. From the viewpoint of the planning, for example, when following with respect to an already generated plan (for example, the action plan) is high and the total length of the trajectory is short, the trajectory obtains high evaluation. For example, a trajectory in which the lane is changed to the left direction and then returning is required when the lane is desired to be changed to the right obtains a low evaluation. From the viewpoint of the safety, for example, as the distance between the subject vehicle M and an object (a nearby vehicle or the like) increases at each trajectory point and the amount of change in acceleration and deceleration or steering angle decreases, high evaluation is obtained.

The switching control unit 150 switches the driving mode between the automated driving mode and the manual driving mode on the basis of, for example, the signal input from the automated driving changeover switch 87. Further, the switching control unit 150 switches driving mode from the automated driving mode to the manual driving mode on the basis of an operation for instructing acceleration, deceleration, or steering with respect to a configuration of the driving operation system in the HMI 70. For example, the switching control unit 150 switches the driving mode from the automated driving mode to the manual driving mode when a state in which the amount of operation indicated by the signal input from the configuration of the driving operation system in the HMI 70 exceeds a threshold value continues for a reference time or more (overriding). Further, the switching control unit 150 may cause the driving mode to return to the automated driving mode when no operation with respect to the configuration of the driving operation system in the HMI 70 is detected for a predetermined time after switching to the manual driving mode by overriding. Further, for example, when handover control for shift from the automated driving mode to the manual driving mode at the scheduled end point of automated driving is implemented, the switching control unit 150 outputs information indicating the fat to the HMI control unit 170 to notify the vehicle occupant of a handover request in advance.

The travel control unit 160 controls the travel driving force output device 200, the steering device 210, and the brake device 220 so that the subject vehicle M passes through the trajectory generated by the trajectory generation unit 146 at the scheduled time.

Figure 12:
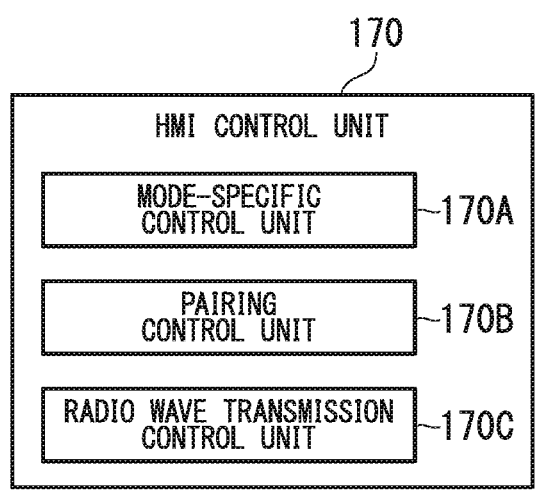
FIG. 12 is a diagram showing an example of a configuration of an HMI control unit 170.

FIG. 12 is a diagram showing an example of a configuration of the HMI control unit 170. The HMI control unit 170 includes a mode-specific control unit 170A, a pairing control unit 170B, and a radio wave transmission control unit 170C.

When the automated driving control unit 120 notifies of information on the automated driving mode, the mode-specific control unit 170A controls the HMI 70 according to a type of the automated driving mode with reference to the mode-specific operation possibility information 188.

Figures 13, 14:
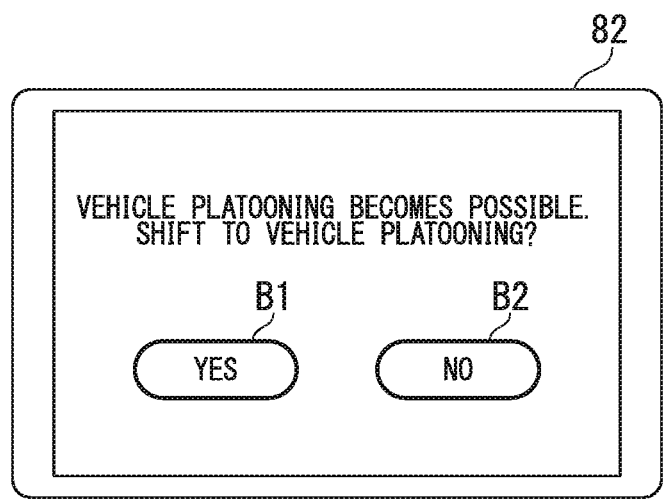
FIG. 13 is a diagram showing an example of mode-specific operation possibility information 188.
FIG. 14 is a diagram showing an example of a screen that is displayed by a display 82 when vehicle platooning is started.

FIG. 13 is a diagram showing an example of the mode-specific operation possibility information 188. The mode-specific operation possibility information 188 shown in FIG. 13 includes "manual driving mode" and "automated driving mode" as items of driving mode. In addition, the "automated driving mode" includes, for example, "mode A", "mode B", and "mode C". Further, the mode-specific operation possibility information 188 includes a "navigation operation" that is an operation with respect to the navigation device 50, a "content reproduction operation" that is an operation with respect to the content reproduction device 85, and an "instrument panel operation" that is an operation with respect to the display 82, as items of the non-driving operation system. In the example of the mode-specific operation possibility information 188 shown in FIG. 13, whether or not the vehicle occupant operates the non-driving operation system is possible is set for each of the above-described driving modes, but an interface device that is a target is not limited thereto.

The mode-specific control unit 170A refers to the mode-specific operation possibility information 188 on the basis of the information on the mode acquired from the automated driving control unit 120 to determine a device of which the use is permitted (one or both of the navigation device 50 and the HMI 70) and a device of which the use is not permitted. In addition, the mode-specific control unit 170A controls whether or not reception of an operation of the vehicle occupant with respect to the HMI 70 of the non-driving operation system or the navigation device 50 is possible on the basis of a result of the determination.

For example, when the driving mode implemented by the vehicle control system 100 is the manual driving mode, the vehicle occupant operates the driving operation system of the HMI 70 (for example, the accelerator pedal 71, the brake pedal 74, the shift lever 76, and the steering wheel 78). In addition, when the driving mode implemented by the vehicle control system 100 is the mode B, the mode C, or the like of the automated driving mode, the vehicle occupant has the surroundings monitoring obligation of the subject vehicle M. In such a case, in order to prevent attention from being distracted (driver distraction) due to an action (for example, an operation of the HMI 70) other than driving of the vehicle occupant, the mode-specific control unit 170A performs control so that an operation with respect to a part or all of the configuration of the non-driving operation system of the HMI 70 is not received. In this case, the mode-specific control unit 170A may cause the presence of a nearby vehicle around the subject vehicle M or a state of the nearby vehicle recognized by the outside world recognition unit 142 to be displayed in an image or the like on the display 82 and cause the HMI 70 to receive a confirmation operation according to a situation at the time of traveling of the subject vehicle M, in order to cause the vehicle occupant to monitor the surroundings of the subject vehicle M.

In addition, when the automated driving mode is the mode A, the mode-specific control unit 170A relaxes the regulation of the driver distraction and performs control to receive the operation of the vehicle occupant with respect to the non-driving operation system of which the operation has not been received. For example, the mode-specific control unit 170A causes the display 82 to display a video, causes the speaker 83 to output sound, or causes the content reproduction device 85 to reproduce t content from a DVD or the like. It should be noted that the content reproduced by the content reproduction device 85 may include, for example, various pieces of content regarding amusement and entertainment such as a television program, in addition to the content stored on the DVD or the like. In addition, the above-described "content reproduction operation" shown in FIG. 13 may mean a content operation regarding such amusement and entertainment.

Further, when the mode is changed from mode A to mode B or mode C, that is, when change to the automated driving mode in which the surroundings monitoring obligation of the vehicle occupant increases is implemented, the mode-specific control unit 170A causes the navigation device 50 or the HMI 70 of the non-driving operation system to output predetermined information. The predetermined information is information indicating that the surroundings monitoring obligation increases or information indicating that a degree of allowance of the operation with respect to the navigation device 50 or the HMI 70 of the non-driving operation system is lowered (the operation is restricted). It should be noted that the predetermined information is not limited thereto, and may be, for example, information prompting preparation for handover control.

As described above, the mode-specific control unit 170A, for example, issues a warning or the like to the vehicle occupant on a predetermined time before the driving mode transitions from the mode A to the mode B or the mode C, or before the subject vehicle M reaches a predetermined speed. Thus, it is possible to notify the vehicle occupant that the surroundings monitoring obligation of the subject vehicle M is imposed on the vehicle occupant at an appropriate timing. As a result, it is possible to give a preparation period for switching of automated driving to the vehicle occupant.

In addition, the mode-specific control unit 170A refers to the information on the travel state notified by the travel state determination unit 146A, and, informs the vehicle occupant that the vehicle control based on the vehicle platooning is started using the navigation device 50 or the HMI 70 when it is found that the travel state is determined to be vehicle platooning.

FIG. 14 is a diagram showing an example of a screen that is displayed by the display 82 when the vehicle platooning is started. On the screen of the display 82, for example, a button B1 for permitting the start of the vehicle platooning and a button B2 for prohibiting the start of the vehicle platooning are displayed. For example, when the vehicle occupant selects the button B1 through a touch operation or the like, the trajectory generation unit 146 outputs information on a line travel trajectory to the travel control unit 160, and the travel control unit 160 controls the travel driving force output device 200, the steering device 210, and the brake device 220 so that the subject vehicle M performs the vehicle platooning. On the other hand, when the vehicle occupant selects the button B2 through a touch operation or the like, the travel state determination unit 146A determines the travel state to be the travel state other than vehicle platooning.

It should be noted that the vehicle platooning may be automatically started without an operation of the vehicle occupant. In this case, the mode-specific control unit 170A causes indication that the vehicle platooning is to be then started to be displayed before the vehicle platooning is started instead of causing the screen asking permission to start the vehicle platooning as shown in FIG. 14 to be displayed on the display 82. In addition, whether or not "the vehicle occupant is to select vehicle platooning if vehicle platooning is possible" may be confirmed by the vehicle occupant before starting automated driving.

The pairing control unit 170B, for example, transmits radio waves (for example, radio waves with different frequency bands) not jammed by jamming radio waves, which is transmitted from the radio wave transmission device 98, using the vehicle cabin communication device 96, to thereby establish a pairing connection to the terminal device. Further, in each automated driving mode, when the travel state is not determined to be the vehicle platooning by the travel state determination unit 146A, the pairing control unit 170B transmits a warning signal to the paired terminal 97 using the vehicle cabin communication device 96. For example, a predetermined screen is displayed by interruption on the paired terminal 97 which has received the warning signal while a screen according to an operation of the vehicle occupant is being displayed. Accordingly, a television program or the like broadcasted in the terminal device is interrupted.

In each automated driving mode, the radio wave transmission control unit 170C transmits jamming radio waves using the radio wave transmission device 98 when the travel state is not determined to be the vehicle platooning by the travel state determination unit 146A. In this case, the radio wave transmission control unit 170C preferably transmits jamming radio waves with a directivity such that jamming radio waves are radiated only around a driver seat not to jam communication of a terminal device that is operated by a vehicle occupant sitting in a passenger seat or a rear seat. Accordingly, the terminal device cannot receive television broadcast waves or the like, and the use of the terminal device is restricted.

It should be noted that only any one of the warning signal and the jamming radio waves as described above may be transmitted, or both may be transmitted.

Figures 15, 16:
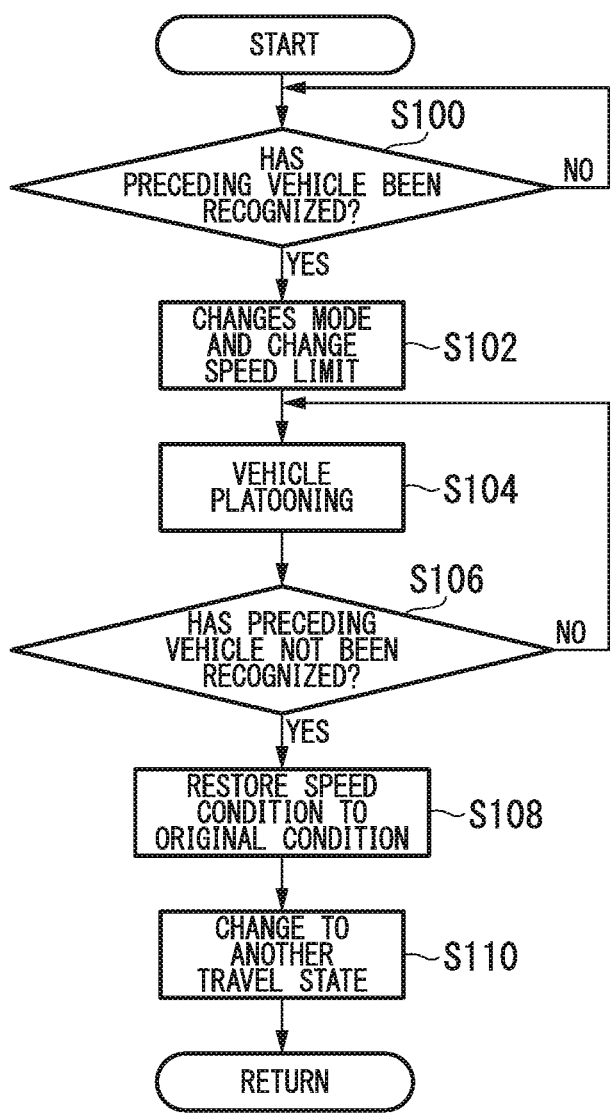
FIG. 15 is a diagram showing comparison between a key point of control of a situation in which vehicle platooning is implemented and a key point of control of a situation in which other travel states other than vehicle platooning are implemented
FIG. 16 is a flowchart showing an example of a flow of a process that is implemented by a vehicle control system 100.

Hereinafter, a change point that occur when the travel state is changed from the other travel states other than the vehicle platooning to the vehicle platooning will be described. FIG. 15 is a diagram for comparison of a key point of control of a situation in which the vehicle platooning is implemented with a key point of control of a situation in which a travel state other than vehicle platooning is implemented. As shown in FIG. 15, for example, in the case of the other travel state, surroundings monitoring is necessary (the surroundings monitoring obligation is imposed), and in the case of the vehicle platooning, the surrounding monitoring may not be necessarily implemented (the surroundings monitoring obligation is not required). Accordingly, it is possible to reduce a burden on the vehicle occupant at the time of following traveling or vehicle platooning.

Further, in the case of the other travel state, an operation with respect to the non-driving operation system of the HMI 70 is received or not received according to a type of the automated driving mode, and in the case of vehicle platooning, the automated driving mode is changed into the mode A in which the surroundings monitoring obligation is not required, and therefore, the operation with respect to the non-driving operation system of the HMI 70 is received. That is, in the case of the other travel state, the use of the non-driving operation system of the HMI 70 may be permitted or not permitted according to the type of automated driving mode, and in the case of the vehicle platooning, the use of the non-driving operation system of the HMI 70 is permitted.

Further, in the case of the other travel state, one or both of the warning signal and the jamming radio waves are transmitted to the terminal device (the paired terminal 97), and in the case of the vehicle platooning, the transmission of the signal and the radio waves is stopped. That is, the use of the terminal device (the paired terminal 97) is not permitted in the case of the other travel state and is permitted in the case of the vehicle platooning.

Further, in the case of the other travel state, the speed limit of the automated driving mode cannot be changed, and in the case of the vehicle platooning, the speed limit of the automated driving mode can be changed. For example, when the speed of the subject vehicle M reaches the speed limit set in the mode A in a case in which change of the speed limit is not taken into consideration under the mode A, the mode A is canceled. In this case, the automated driving mode is changed to the mode B or the mode C in which the degree of surroundings monitoring obligation is higher, other than the mode A, or is changed to the manual driving mode. Accordingly, as the surroundings monitoring obligation increases, the mode-specific control unit 170A controls the content reproduction device 85 so that content reproduction from a DVD or the like is stopped, or the pairing control unit 170B transmits a warning signal to the paired terminal 97 or the radio wave transmission control unit 170C transmits jamming radio waves to the terminal device, thereby stopping broadcasting of a television program or the like at the terminal device.

On the other hand, in a case where the speed limit is changed when the travel state is changed to the vehicle platooning, it is easy to continue the automated driving mode being implemented. As a result, when the automated driving mode being implemented is the mode A, content reproduction, broadcasting of a television program, or the like is not interrupted. As a result, convenience for the vehicle occupant can be improved.

FIG. 16 is a flowchart showing an example of a flow of a process that is implemented by the vehicle control system 100. The process of this flowchart is implemented, for example, in a state in which the automated driving mode to be implemented by the automated driving mode control unit 130 is determined to be any one of the automated driving modes.

First, the automated driving mode control unit 130 waits until the companion vehicle can be selected from among nearby vehicles (step S100). When the companion vehicle can be selected, the automated driving mode control unit 130 changes the automated driving mode as described above and changes the speed limit (step S102). Then, the travel state determination unit 146A determines the travel state to be the vehicle platooning (step S104). The trajectory generation unit 146 generates a trajectory for vehicle platooning, and the travel control unit 160 controls the travel driving force output device 200, the steering device 210, and the brake device 220 based on the trajectory for vehicle platooning, such that the subject vehicle M performs the vehicle platooning.

Then, the automated driving mode control unit 130 determines whether to end the vehicle platooning (step S106). The vehicle platooning is ended when the destination of the companion vehicle is changed or when the vehicle occupant performs an end operation. When the vehicle platooning is not ended, the vehicle control system 100 returns the process of S104 described above.

On the other hand, when the vehicle platooning is ended, the automated driving mode control unit 130 restores the speed limit to an original speed limit (step S108), and the travel state determination unit 146A changes the travel state to another travel state (step S110). Accordingly, the process of this flowchart ends.

According to the above-described embodiment, the nearby vehicles traveling around the subject vehicle M are recognized, and the automated driving modes in which at least one of the speed control and the steering control of the subject vehicle M is automatically implemented, which are a plurality of automated driving modes having different degrees of surroundings monitoring obligation of the subject vehicle imposed on the occupant of the subject vehicle M, is implemented. When the vehicle platooning in which the subject vehicle travels while following the preceding vehicle traveling in front of the subject vehicle among the recognized nearby vehicles is implemented, the surroundings monitoring obligation of the subject vehicle M is reduced. Thus, it is possible to reduce a burden on the vehicle occupant during automated driving.

Although the modes for carrying out the present invention have been described above by way of embodiments, the present invention is not limited to the embodiments at all, and various modifications and substitutions may be made without departing from the spirit of the present invention.

REFERENCE SIGNS LIST

20 Finder
30 Radar
40 Camera
DD Detection device
50 Navigation device
55 Communication device
60 Vehicle sensor
70 HMI
100 Vehicle control system
110 Target lane determination unit
120 Automatic operation control unit
130 Automated driving mode control unit
140 Subject-vehicle position recognition unit
142 Outside world recognition unit
144 Action plan generation unit
146 Trajectory generation unit
146A Travel state determination unit
146B Trajectory candidate generation unit
146C Evaluation and selection unit
150 Switching control unit
160 Travel control unit
170 HMI control unit
180 Storage
200 Travel driving force output device
210 Steering device
220 Brake device
M Subject vehicle

What is claim is:

1. A vehicle control system comprising:
a processor; and
a non-transitory memory that stores program instructions that, when executed by the processor, facilitate performance of operations, comprising:
recognizing nearby vehicles traveling around a subject vehicle;
implementing a plurality of automated driving modes in which at least one of speed control and steering control of the subject vehicle is automatically implemented, the plurality of automated driving modes having different degrees of surroundings monitoring obligation of the subject vehicle imposed on an occupant of the subject vehicle,
wherein the plurality of automated driving modes has a predetermined automated driving mode, the predetermined automated driving mode including a vehicle platooning and other travel state other than the vehicle platooning,
the vehicle platooning is a travel state in which the subject vehicle travels while following a travel trajectory of a preceding vehicle traveling in front of the subject vehicle,
the other travel state is set to a first speed limit and the vehicle platooning is set to a second speed limit, the second speed limit being greater than the first speed limit,
wherein the operations further comprise:
executing the predetermined automated driving mode up to the first speed limit under the other travel state of the predetermined automated driving mode; and
executing the predetermined automated driving mode up to the second speed limit under the vehicle platooning of the predetermined automated driving mode.

2. The vehicle control system according to claim 1, wherein the operations further comprise suppressing some or all functions of a terminal device that is brought into a vehicle cabin of the subject vehicle and is able to be operated by the occupant of the subject vehicle when the automated driving mode in which the surroundings monitoring obligation of the subject vehicle is imposed on the occupant of the subject vehicle is implemented.

3. A vehicle control system comprising:
a processor; and
a non-transitory memory that stores program instructions that, when executed by the processor, facilitate performance of operations, comprising:
recognizing a nearby vehicle traveling around a subject vehicle; and
implementing an automated driving mode in which at least one of speed control and steering control of the subject vehicle is automatically implemented, the automated driving control being configured to implement any one of a plurality of automated driving modes having different degrees of automated driving, wherein the plurality of automated driving modes has a predetermined automated driving mode, the predetermined automated driving mode including a vehicle platooning and other travel state other than the vehicle platooning, the vehicle platooning is a travel state in which the subject vehicle travels while following a travel trajectory of a preceding vehicle traveling in front of the subject vehicle, the other travel state is set to a first speed limit and the vehicle platooning is set to a second speed limit, the second speed limit being greater than the first speed limit, wherein the operations further comprise:
    executing the predetermined automated driving mode up to the first speed limit under the other travel state of the predetermined automated driving mode, and
    executing the predetermined automated driving mode up to the second speed limit under the vehicle platooning of the predetermined automated driving mode.

4. A vehicle control method comprising:

recognizing, by an in-vehicle computer, nearby vehicles traveling around a subject vehicle;

executing, by the in-vehicle computer, a plurality of automated driving modes in which at least one of speed control and steering control of the subject vehicle is automatically implemented, the plurality of automated driving modes having different degrees of surroundings monitoring obligation of the subject vehicle imposed on an occupant of the subject vehicle;

wherein the plurality of automated driving modes has a predetermined automated driving mode, the predetermined automated driving mode including a vehicle platooning and other travel state other than the vehicle platooning, the vehicle platooning is a travel state in which the subject vehicle travels while following a travel trajectory of a preceding vehicle traveling in front of the subject vehicle and a degree of the surroundings monitoring obligation is less than the other travel state, the other travel state is set to a first speed limit and the vehicle platooning is set to a second speed limit, the second speed limit being greater than the first speed limit, wherein the vehicle control method further comprises:
    executing, by the in-vehicle computer, the predetermined automated driving mode up to the first speed limit under the other travel state of the predetermined automated driving mode, and
    executing, by the in-vehicle computer, the predetermined automated driving mode up to the second speed limit under the vehicle platooning of the predetermined automated driving mode.

5. A vehicle control program causing an in-vehicle computer to:

recognize nearby vehicles traveling around a subject vehicle;

execute a plurality of automated driving modes in which at least one of speed control and steering control of the subject vehicle is automatically implemented, the plurality of automated driving modes having different degrees of surroundings monitoring obligation of the subject vehicle imposed on an occupant of the subject vehicle;

wherein the plurality of automated driving modes has a predetermined automated driving mode, the predetermined automated driving mode including a vehicle platooning and other travel state other than the vehicle platooning, the vehicle platooning is a travel state in which the subject vehicle travels while following a travel trajectory of a preceding vehicle traveling in front of the subject vehicle and a degree of the surroundings monitoring obligation is less than the other travel state, the other travel state is set to a first speed limit and the vehicle platooning is set to a second speed limit, the second speed limit being greater than the first speed limit, wherein the vehicle control program further causes the in-vehicle computer to:
    execute the predetermined automated driving mode up to the first speed limit under the other travel state of the predetermined automated driving mode, and
    execute the predetermined automated driving mode up to the second speed limit under the vehicle platooning of the predetermined automated driving mode.

\* \* \* \* \*